July 19, 1932. C. BOGERT 1,867,802
EXHAUST GAS AND ODOR ELIMINATOR FOR MOTOR VEHICLES
Filed May 17, 1930
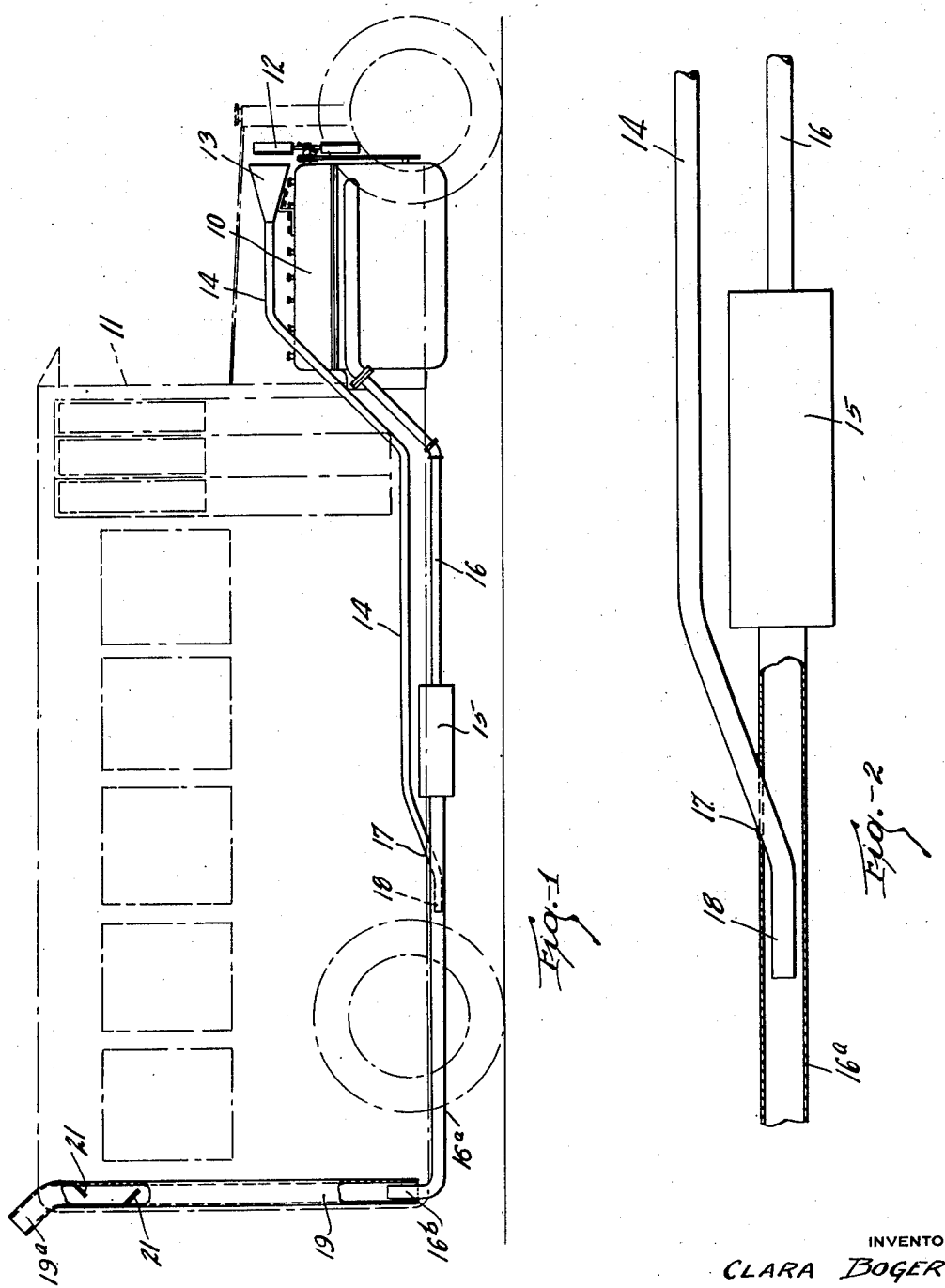
INVENTOR
CLARA BOGERT
BY
Ely & Barrow
ATTORNEYS Patented July 19, 1932

1,867,802

UNITED STATES PATENT OFFICE

CLARA BOGERT, OF AKRON, OHIO

EXHAUST GAS AND ODOR ELIMINATOR FOR MOTOR VEHICLES

Application filed May 17, 1930. Serial No. 453,246.

This invention relates to exhaust gas and exhaust gas odor eliminators for motor driven vehicles.

In the various motor driven vehicles such as closed private cars, busses and trucks, much difficulty has heretofore been experienced with the presence of the highly toxic exhaust gases and obnoxious odors within the closed bodies. This is especially true of busses and bus companies engaged as carriers suffer much litigation and damages because of passengers made ill and in some cases actually suffocated by such gases and odors.

Many attempts to overcome this difficulty have been made and are, in fact, now being made which, so far as is known, have not been successful. By the present invention, however, the elimination of exhaust gases and odors from such vehicles has been successfully accomplished.

The general purpose of the invention is to provide in combination with a motor vehicle of the type described of means for delivering a strong draft of air into the exhaust line at such a point therein and in such a way that the air will be effectively mixed with the exhaust gases and the mixture will be freely dissipated to the atmosphere.

The foregoing and other purposes of the invention are attained in the exhaust gas and odor eliminator shown in the accompanying drawing and described below. It is to be understood that the invention is not limited to the specific form thereof shown and described.

Of the accompanying drawing,

Figure 1 is an elevation partly in section of the exhaust gas and odor eliminator shown installed in a bus (indicated in dotted lines);

Figure 2 is an enlarged view, partly in section, of the connection between the air and exhaust gas lines.

Referring to the drawing, the numeral 10 designates the motor of a bus 11 which motor includes the usual cooling fan 12. Arranged in back of this fan 12 is a funnel 13 to trap air blown by the fan and deliver it to air duct 14. Air may be pumped into duct 14 by other suitable means when required, but ordinarily sufficient air is obtainable in this manner from the usual cooling fan and at little expense.

The duct 14 is extended beyond the muffler 15 in the usual motor exhaust line 16. Beyond the muffler 15 the exhaust line 16$^a$ is increased in size an amount sufficient to permit free passage not only of the exhaust but of the current of air added thereto as will be explained.

The duct 14 is designed to deliver a comparatively large quantity of air to the exhaust line 16$^a$, this duct being extended into the exhaust line as at 17 and along in the exhaust line toward its outlet for a short distance as at 18. By this construction the strong current of air entering the enlarged exhaust line 16$^a$ forces the exhaust gases along the mixed current having free and unobstructed travel to the exhaust outlet. Usually an additional pump or blower in the exhaust line may be avoided if the exhaust line is sufficiently large to allow free travel of the mixed gases. However, such a pump and blower may be used.

In the case of busses and the like, it is preferable to turn the exhaust line 16$^a$ upwardly as at 16$^b$ and extend it for a short distance into a vertical stack 19 arranged at the rear of the bus, this stack extending to the top of the bus where it is turned or bent rearwardly preferably at about a 45° bend as shown at 19$^a$.

In order to prevent the spraying of moisture into the air by the stack 19, baffles 21, 21 may be so arranged therein as to collect the larger part of the moisture which drains down and out of the lower end of stack 19.

It has been found that the flow of mixed air and gases from the exhaust line 16$^a$, 16$^b$ into the stack 19 causes a flow of cold air up through the bottom of the stack which admixes with the air and gases from the exhaust line further diluting the exhaust gases and condensing the moisture therein which apparently dissolves certain impurities in the exhaust gases, these impurities passing out with the water which drains from the bottom of the stack.

So far as is known, the present is the first invention to successfully solve the problem of overcoming the presence of exhaust gas and obnoxious odors in closed vehicles. In operation, either when idling or operating under heavy loads, the exhaust gases are thoroughly mixed with air and freely dissipated to the atmosphere. Such a little odor remains in the gases when they pass from the vehicle that presumably some reaction of the air and gases has taken place.

Many modifications of the invention may be resorted to without departing from the spirit thereof or the scope of the appended claims.

What is claimed is:—

1. The combination with a motor vehicle driven by an internal combustion engine including the internal combustion engine, a radiator cooling fan driven thereby, a gas exhaust duct and a muffler to which the gas exhaust duct leads, of a funnel associated with said fan to receive air therefrom, an air duct leading from the funnel, a combined gas and air exhaust duct leading from the muffler to the rear of the vehicle said air duct being extended into said combined gas and air exhaust duct to deliver air thereto, said combined gas and air exhaust duct being larger in section than the exhaust gas duct by substantially the sectional area of the air duct and being unobstructed to permit free flow of mixed exhaust gas and air therethrough, a stack at the rear of the vehicle into which the combined gas and air exhaust duct empties, said stack being of greater sectional area than the combined air and gas exhaust duct and open at its bottom end whereby air will be drawn therein said stack having baffles therein, the top of the stack being directed rearwardly of the vehicle.

2. The combination with a motor vehicle driven by an internal combustion engine including the internal combustion engine, a radiator cooling fan driven thereby, a gas exhaust duct and a muffler to which the gas exhaust duct leads, of a funnel associated with said fan to receive air therefrom, an air duct leading from the funnel, a combined gas and air exhaust duct leading from the muffler to the rear of the vehicle said air duct being extended into said combined gas and air exhaust duct to deliver air thereto, said combined gas and air exhaust duct being larger in section than the exhaust gas duct by substantially the sectional area of the air duct and being unobstructed to permit free flow of mixed exhaust gas and air therethrough, a stack at the rear of the vehicle into which the combined gas and air exhaust duct empties, said stack being of greater sectional area than the combined air and gas exhaust duct and open at its bottom end whereby air will be drawn therein, said stack having baffles therein.

3. The combination with a motor vehicle driven by an internal combustion engine including the internal combustion engine, a radiator cooling fan driven thereby, a gas exhaust duct and a muffler to which the gas exhaust duct leads, of a funnel associated with said fan to receive air therefrom, an air duct leading from the funnel, a combined gas and air exhaust duct leading from the muffler to the rear of the vehicle said air duct being extended into said combined gas and air exhaust duct to deliver air thereto, said combined gas and air exhaust duct being larger in section than the exhaust gas duct by substantially the sectional area of the air duct and being unobstructed to permit free flow of mixed exhaust gas and air therethrough, a stack at the rear of the vehicle into which the combined gas and air exhaust duct empties, said stack being of greater sectional area than the combined air and gas exhaust duct and open at its bottom end whereby air will be drawn therein.

4. The combination with a motor driven vehicle including an internal combustion engine and an exhaust line having a muffler thereon, of means for eliminating exhaust gas and its odor from the vehicle, said exhaust line having a portion beyond the muffler extending toward the exhaust outlet which is of sufficient area throughout and unobstructed so as to permit the free passage of the exhaust gas along with a current of air, an air line extended into said portion of the exhaust line and directed therein toward the exhaust outlet, power driven means for supplying air to said air line whether the engine is idling or driving the vehicle, and a stack into which the exhaust line is upwardly extended, said stack having an opening at its bottom whereby air will be drawn by the exhaust up through the stack and will be admixed with the exhaust and whereby moisture may drain therefrom.

CLARA BOGERT.